(12) United States Patent
Tice et al.

(10) Patent No.: US 12,511,721 B2
(45) Date of Patent: Dec. 30, 2025

(54) USING SPLIT SUMMED AREA TABLES FOR IMAGE PROCESSING

(71) Applicant: Adobe Inc., San Jose, CA (US)

(72) Inventors: Raymond Tice, Billerica, MA (US); Arghya Sur, Noida (IN)

(73) Assignee: Adobe Inc., San Jose, CA (US)

( * ) Notice: Subject to any disclaimer, the term of this patent is extended or adjusted under 35 U.S.C. 154(b) by 316 days.

(21) Appl. No.: 18/321,687

(22) Filed: May 22, 2023

(65) Prior Publication Data
US 2024/0394847 A1   Nov. 28, 2024

(51) Int. Cl.
*G06T 5/70* (2024.01)
*G06T 7/10* (2017.01)

(52) U.S. Cl.
CPC . *G06T 5/70* (2024.01); *G06T 7/10* (2017.01)

(58) Field of Classification Search
CPC .............................. G06T 5/00–94; G06T 7/10
See application file for complete search history.

(56) References Cited

U.S. PATENT DOCUMENTS

| | | | | |
|---|---|---|---|---|
| 2010/0128993 A1* | 5/2010 | Sebe | .................... | G06V 40/161 |
| | | | | 345/441 |
| 2016/0093032 A1* | 3/2016 | Lei | ............. | G06T 5/70 |
| | | | | 382/264 |
| 2016/0110631 A1* | 4/2016 | Lee | ....................... | G06V 10/507 |
| | | | | 382/103 |
| 2016/0224847 A1* | 8/2016 | Fernandez | ............. | G06V 20/58 |
| 2017/0371838 A1* | 12/2017 | Kasagi | ................. | G06V 10/446 |
| 2018/0137600 A1* | 5/2018 | Ha | ............. | G06T 7/11 |
| 2019/0295233 A1* | 9/2019 | Senzaki | .................... | G06T 5/50 |
| 2022/0309617 A1* | 9/2022 | Chen | ........................ | G06T 5/20 |

* cited by examiner

*Primary Examiner* — Sean T Motsinger
(74) *Attorney, Agent, or Firm* — Nicholson De Vos Webster & Elliott LLP

(57) ABSTRACT

Embodiments are disclosed for performing image processing operations on images using pixel values stored in summed area sub-tables. In particular, in one or more embodiments, the method may include receiving blur parameters for performing a blur operation on an image, the blur parameters including a blur region and a blur size indicating a number of pixels to sample for each output pixel. The method may further include creating a summed area table representation of the image based on pixel values for pixels of the image, the summed area table representation including a plurality of summed area sub-tables. The method may further include performing the blur operation on the blur region of the image using the plurality of summed area sub-tables.

19 Claims, 8 Drawing Sheets

FIG. 4

USING SPLIT SUMMED AREA TABLES FOR IMAGE PROCESSING

BACKGROUND

Image processing involves the analysis and/or manipulation of an input image to generate information determined from the analysis the input image and/or an output image having some modifications or changes from the input image. Summed area tables are commonly used for performing image processing operations and in other fields, including statistics and machine learning. A summed area table, also known as an integral image or prefix sum table, is a data structure storing the generated sum of values in a grid or table of values. Each output value of a summed area table for a given input value of an input table is generated by summing the input value and the values preceding the input value, both above and to the left. For image processing, the table of values can be the pixel values of each pixel within an input image.

SUMMARY

Introduced here are techniques/technologies that allow an image processing system to perform image processing operations on images by segmenting the image and generating summed area sub-tables, each representing the pixel values for a corresponding segment of the image. By segmenting the image into a plurality of summed area sub-tables, the image processing system can perform the image processing operations while minimizing accumulated error.

In particular, in one or more embodiments, an image processing system receives a request to perform a pixel blurring image processing operation on an image. For an image, the input can be a table including pixel values for each pixel of the image. To perform the pixel blurring image processing operation, the input table can be split or segmented into a plurality of segments based on a blur size (e.g., a lookup span) and a summed area sub-table independently calculated for each of the plurality of segments based on only the pixel values within a corresponding segment. The image processing system then determines each output pixel, where each output pixel is the mean value calculated from the sum of a number of pixels (e.g., based on the blur size) divided by the number of pixels. Where the lookup span involves values from multiple summed area sub-tables, the sum from each sub-table is computed, aggregated, and then divided by the pixel count.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 4 illustrates an example process of determining values for performing an image processing operation on an input image in accordance with one or more embodiments;

DETAILED DESCRIPTION

Figure 1:
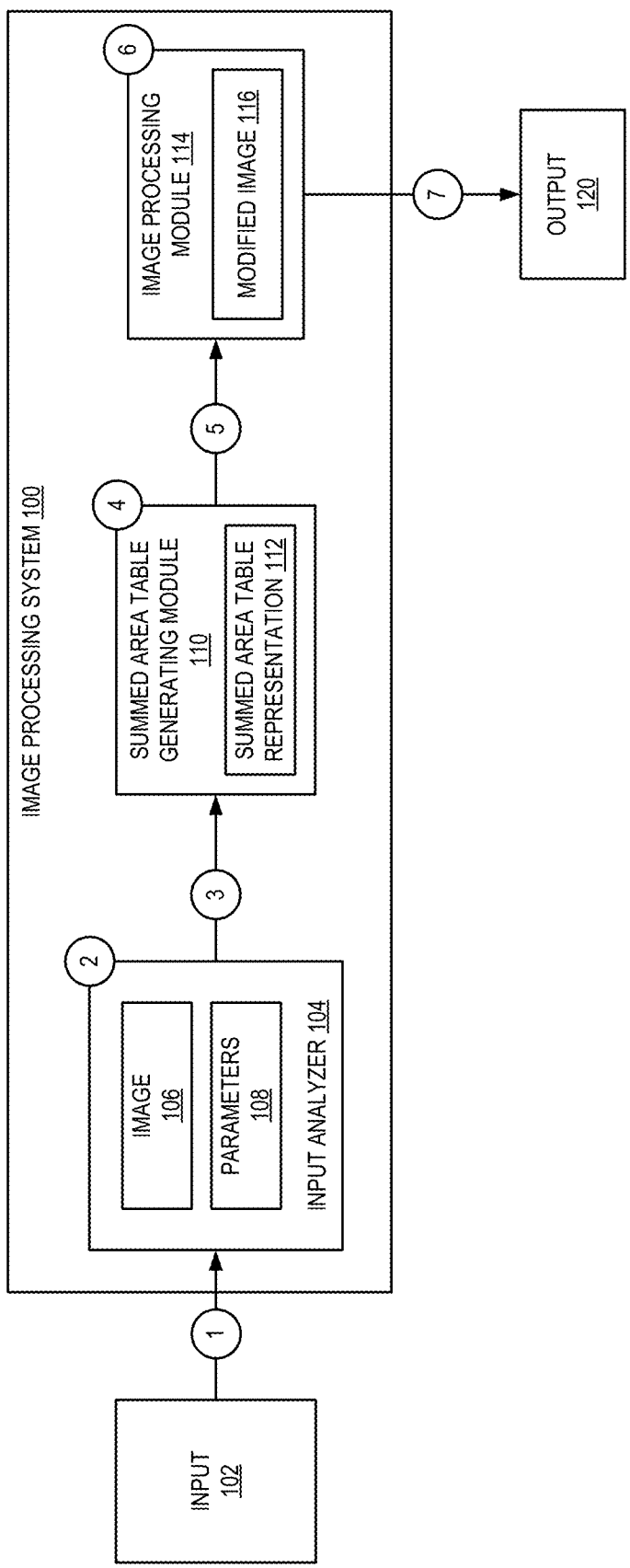
FIG. 1 illustrates a diagram of a process of performing image processing operations using summed area sub-tables in accordance with one or more embodiments.

One or more embodiments of the present disclosure include an image processing system that partitions a table into a plurality of segments based on parameters for an image processing operation and generates an independent summed area sub-table for each of the plurality of segments. In image processing, summed area table of pixel values of an image can be used for pixel blurring, texture sampling, and other image process operations.

One drawback of summed area tables is that because of the limitations of memory in computing devices, the computation of output values can accumulate error due to rounding or overflow, particularly when the input table of values has a large number of entries and/or as the values in the entries are large. For example, when a single summed area table is used as the input table of values, as the size of the table increases, the summed values can become very large, which can result in rounding and/overflow in storage and accumulation errors. For example, IEEE 754-half precision floating point has an effective significand of 11 bits. If two or more values are summed, some rounding of the result may occur to fit in the significand. The more values that are summed, the greater the potential for rounding may occur. For summed area tables, this error is related to the length/size of the input table, and the error increases for later values in the summed area table (as it is the sum of an increasingly greater number of input values). As many uses of summed area tables involve the difference between samples (e.g., values in the generated summed area table), the error of the resulting value can be large.

One conventional approach for handling the accumulated error problem is to use a number format that allows for a larger significand. For integers representations, this can include using a number format that has a larger number of bits. For fractional representations, such as floating point, a larger number format with a larger significand (e.g., doubles instead of floats) can be used or the number format can be switched from floating point to fixed point notation. However, these solutions can be resource intensive and require greater computing power and computing resources to perform calculations of values with larger number of bits. Further, a higher precision number format may not be available on many GPUs.

To address these and other deficiencies in conventional systems, the image processing system of the present disclosure partitions an input table of values into a plurality of segments and produces a summed area sub-tables for each of the plurality of segments. Because the input table is split into segments, each with its own summed area sub-table, output values for entries in each summed area sub-table are calculated based only on the input values within the corresponding segment. In this manner, calculations within each summed area sub-table result in smaller values that can better fit in storage without overflow or rounding. Thus, the resource and computing costs of computing a plurality of summed area sub-tables is less than computing a single summed area table.

Further, for lookup operations that require values from multiple sub-tables, the lookup span is divided into sub-spans (e.g., for each sub-table contributing to the lookup operation) and then aggregated. Calculating values using output values from multiple summed area sub-tables can result in reduced accumulation errors, resulting in more accurate values. In addition, by performing image processing operations using summed area tables that have been split into a plurality of summed area sub-tables, the image processing system of the present disclosure utilizes fewer computing resources and can generate the summed area sub-tables more efficiently. Further, the image processing system can use the summed area sub-tables to generate larger summed area sub-tables via efficient merging. For example, by using parallel scan, the image processing system of the present disclosure can merge summed area sub-tables over parallel threads in a logarithmic number of sequential steps, where each thread can focus on merging summed area sub-tables at different locations. By dividing into multiple sub-table groupings, the computation can still be performed independently over parallel threads in a lesser number of sequential steps, reducing the computation overhead of creating the table. Further, as the parallel scan is an in-place operation, the GPU shared memory can be used to store the summed area sub-tables for faster access, reducing the cost required for multiple sub-table results for final blur computations.

FIG. 1 illustrates a diagram of a process of performing image processing operations using summed area sub-tables in accordance with one or more embodiments. While embodiments are described with respect to image processing using an image processing system, the embodiments can be applicable to any type of data stored in summed area tables. For example, other embodiments in which the summed area sub-table process can be applied to other types of data having higher or lower dimensions, including volumetric data (e.g., geographic information) and machine learning parameters.

As shown in FIG. 1, an image processing system 100 receives an input 102, as shown at numeral 1. For example, the image processing system 100 receives the input 102 from a user via a computing device or from a memory or storage location. In one or more embodiments, the input 102 includes at least an image (e.g., image 106) and parameters for performing an image processing operation (e.g., parameters 108). In one or more embodiments, the input 102 can be provided in a graphical user interface (GUI).

As illustrated in FIG. 1, the image processing system 100 includes an input analyzer 104 that receives the input 102. In some embodiments, the input analyzer 104 analyzes the input 102, as shown at numeral 2. In some embodiments, the input analyzer 104 analyzes the input 102 to identify image 106 and parameters 108. In one or more embodiments, the parameters 108 define an image processing operation to be performed on the image 106. Example image processing operations can include image blurring, texture sampling, etc. In one or more embodiments, the parameters 108 for an image processing operation includes, at least, the area to be summed. For example, for an image blur operation, the parameters 108 can include information indicating a blur region of the image 106 and a blur size. In one or more embodiments, the blur region can be all of the image 106. The blur size can indicate a number of pixels to sample from the image for each output pixel. For example, parameters 108 indicating a blur size of four pixels indicates that the pixel values for four pixels adjacent to each pixel in the blur region contribute to the pixel value of each output pixel.

After the input analyzer 104 analyzes the input 102 to identify the image 106 and the parameters 108, the image 106 and the parameters 108 are sent to summed area table generating module 110, as shown at numeral 3. In one or more embodiments, the summed area table generating module 110 is configured to generate a summed area table representation 112 of the image 106, at numeral 4. The summed area table representation 112 of the image 106 can include a plurality of summed area sub-tables. In some embodiments, each summed area sub-table can represent a separate segment of the image 106, where the image 106 is segmented into horizontal strips across the image 106, vertical strips across the image 106, or tiled sections of the image 106.

In some embodiments, the segments can be the same width across all of the image 106 or the widths of the segments can vary in size. For example, a first region of the image 106 can have a first set of segments with a first width, while a second region of the region of the image 106 can have a second set of segments with a second width. In such embodiments, the different widths can be based on the application of different blur sizes to the different regions of the image 106. In one or more embodiments, the width of each summed area sub-table is based on the blur size. For example, where the parameters 108 provide a blur size of four pixels, the summed area table generating module 110 splits the image 106 into a plurality of segments having a similar width in pixels. In one or more embodiments, where the resulting quotient is not a whole number, the number may be rounded up to the next whole number. In such embodiments, where the segments are strips, by selecting the segment widths at least to the blur size, the blur operation for each pixel will involve the computation of values from, at most, two summed area sub-tables. In other embodiments, the number of summed area sub-tables involved in the computation of values is $2^N$, where N is the number of dimensions being operated in. For example, where the segments are tiled segments of the image 106, the blur operation for each pixel will involve the computation of values from, at most, four summed area sub-tables.

In one embodiment, the summed area table generating module 110 rounds the diameter of the blur size to the next power of two to determine the segment widths. In one or more embodiments, the segment widths can be larger or smaller than this value, depending on noise settings.

Figure 2:
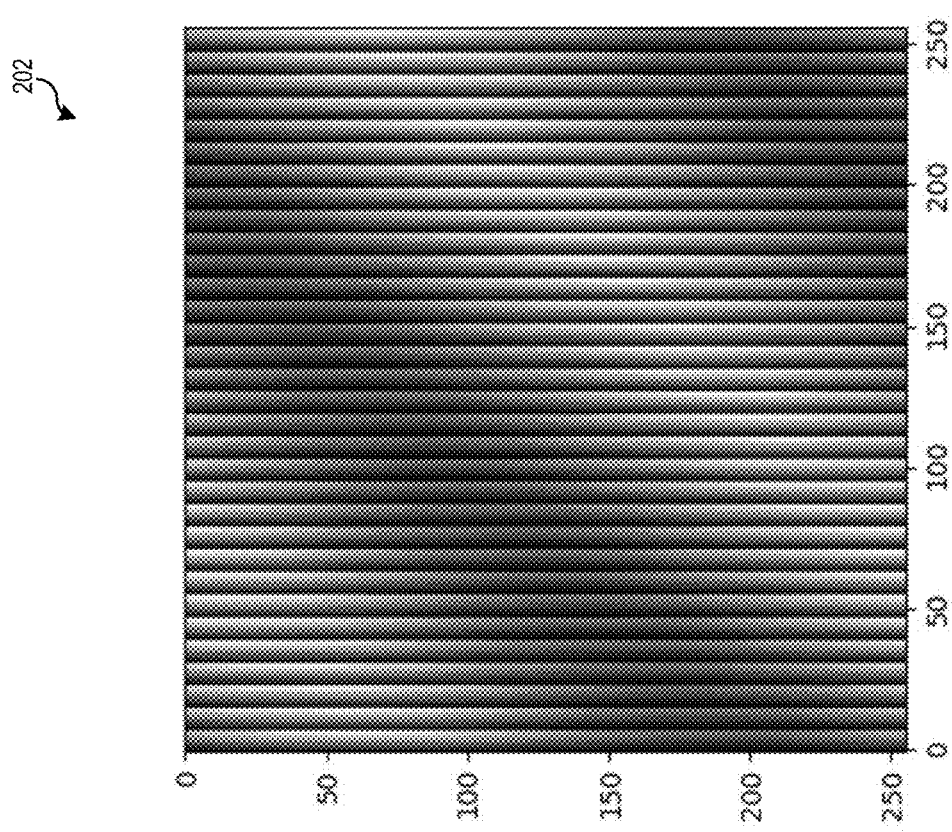
FIG. 2 illustrates an example input image and summed area sub-tables generated from the image in accordance with one or more embodiments.
Figure 2:
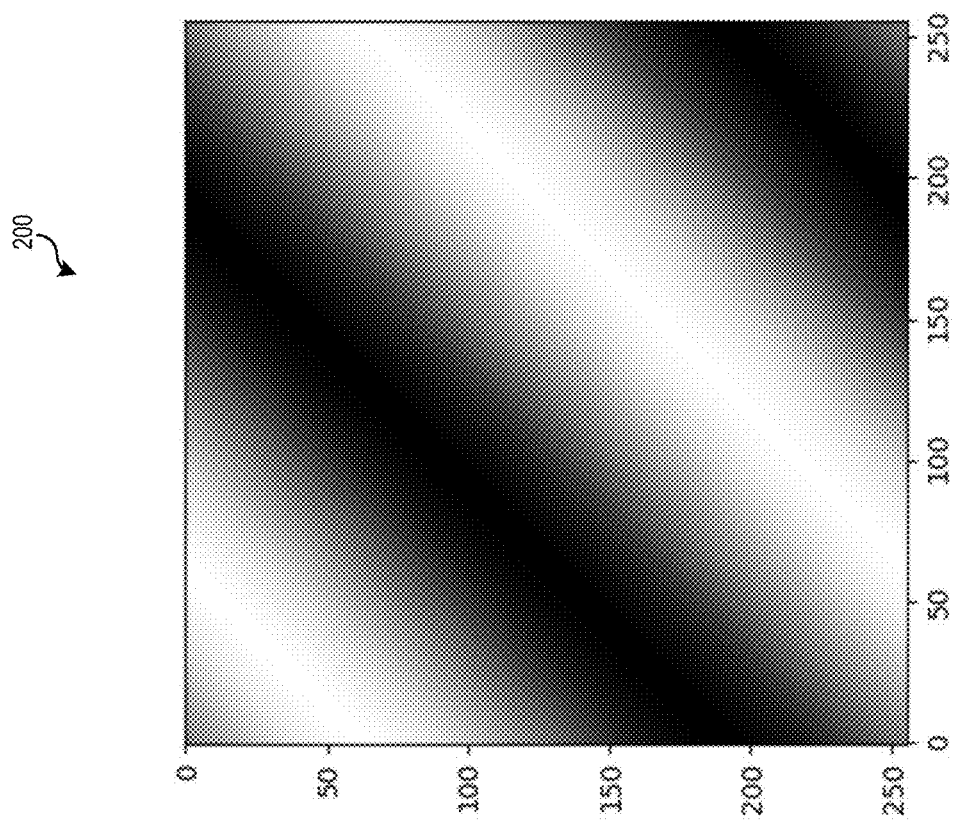

FIG. 2 illustrates an example input image and summed area sub-tables generated from the image in accordance with one or more embodiments. Image 200 is a 256×256 pixel image. Image 202 is a summed area sub-table representation of image 200, where image 200 has been segmented into 32 vertical segments, where each vertical segment (e.g., 206A-N) has a width of eight pixels.

The pixel values for the image 106 can have different ranges. In one example, the pixel values can range from "0.0" to "1.0" Typically, to calculate a summed area table, the values are calculated by the value at any point (x, y) in the summed area table is the sum of the pixel values of all the pixels above and to the left of point (x, y), inclusive, starting at the first pixel at the upper left of the image and ending at the last pixel at the lower right of the image.

However, to calculate a summed area sub-table for a first segment of the plurality of segments, the summed area table generating module 110 uses only the pixel values for pixels within the first segment. In one or more embodiments, the values are calculated by the value at any point (x, y) in a summed area sub-table for a first segment is the sum of the pixel values of all the pixels above and to the left of point (x, y), inclusive, starting at the pixel at the upper left of the first segment and ending at the last pixel at the lower right of the first segment. In one or more other embodiments, the summed area sub-tables can be calculated from taking the values from a different direction (e.g., the sum of the pixel values of all the pixels above and to the right of point (x, y), inclusive, starting at the pixel at the upper right of the first segment and ending at the last pixel at the lower left of the first segment).

Figure 3:
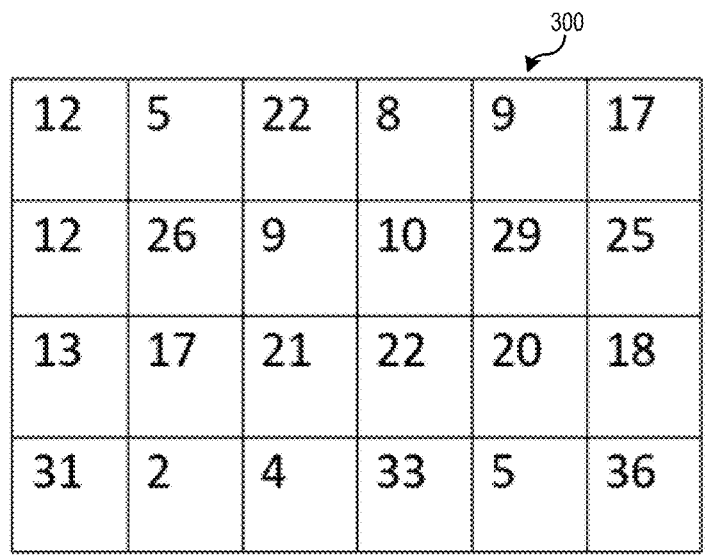
FIG. 3 illustrates example summed area sub-tables generated from an input image in accordance with one or more embodiments.
Figure 3:
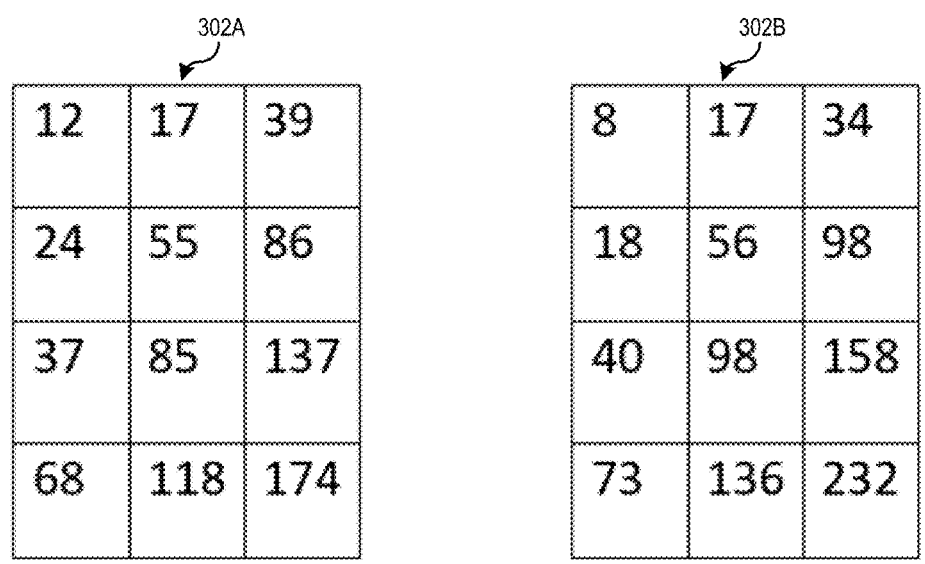

FIG. 3 illustrates example summed area sub-tables generated from an input image in accordance with one or more embodiments. In one or more embodiments, table 300 represents pixel values for an input image that is four pixels by six pixels. In one or more embodiments, based on the parameters (e.g., parameters 108) received in an input (e.g., input 102) to the image processing system 100, the summed area table generating module 110 generates summed area sub-table 302A and summed area sub-table 302B. Summed area sub-table 302A is based on summed area table calculations using the pixels in the first three pixels columns of table 300 and summed area sub-table 302B is based on summed area table calculations using the pixels in the last three pixels columns of table 300. In some embodiments, the width of the summed area sub-tables is based on the blur size indicated by the parameters 108. For example, if the blur size is five pixels, the widths of the summed area sub-tables can be set to five pixels. In one or more embodiments, a variable blur size can be defined (e.g., a first blur size in a first region of the image and a second blur size in a second region of the image). In such embodiments, the widths of the summed area sub-tables can be set to the blur size, or approximately the blur size, for the associated regions of the image.

In other embodiments, the width of the summed area sub-tables is based on the summed area table generating module 110 determination of an overflow. The determination of an overflow can be based on pre-calculations or during/after summations are calculated. For example, overflow can be determined through a pre-calculation, based on the possible range of the sum, the number of samples, accumulated error and the resolution needed. For example, given an input where the possible values for each sample (e.g., pixel value) is 0-255 and given 256 samples (e.g., pixels), the maximum range is 0 to 65,280 (i.e., the sum of 255×256). This value would fit in an unsigned 16-bit value. In one or more embodiments, to determine floating point error accumulation and needed accuracy, the maximum possible accumulated rounding error is calculated. The maximum possible accumulated rounding error increases as the possible maximum value increases, which increases with the number of samples (e.g., pixels). For example, assuming six values from the summed area sub-tables are used to compute a value, where each value has an error of +/−0.5, the error from adding/subtracting the values results in an error of +/−3. The required accuracy can depend on the resulting values. For example, if a desired accuracy of an average is +/−0.01, where the number of values being averaged is always at least 100 values, the sum is only required to be accurate to the nearest integer because to calculate the average, the sum will always be divided by at least 100.

In another example, overflow can be determined through a pre-calculation at run time following the same process described above, but with knowledge of the specific values for each of the 256 pixels. In another example, overflow can be determined during or after summation. In such examples, the summed area table generating module 110 can detect an overflow and adapt partway through the summation process. In one or more embodiments, this may be appropriate when there is no prior knowledge of the signal range.

Returning to FIG. 1, after the summed area table generating module 110 generates the summed area table representation 112 of the image 106, the summed area table representation 112 and the parameters 108 are sent to an image processing module 114, as shown at numeral 5. The image processing module 114 is configured to perform the image processing operation defined by the parameters 108, at numeral 6. As noted above, for an image blur operation, the parameters 108 can include information indicating a blur region of the image 106 and a blur size. For example, the image processing module 114 can generate modified image 116 from the image 106 based on the parameters 108.

Figure 4:
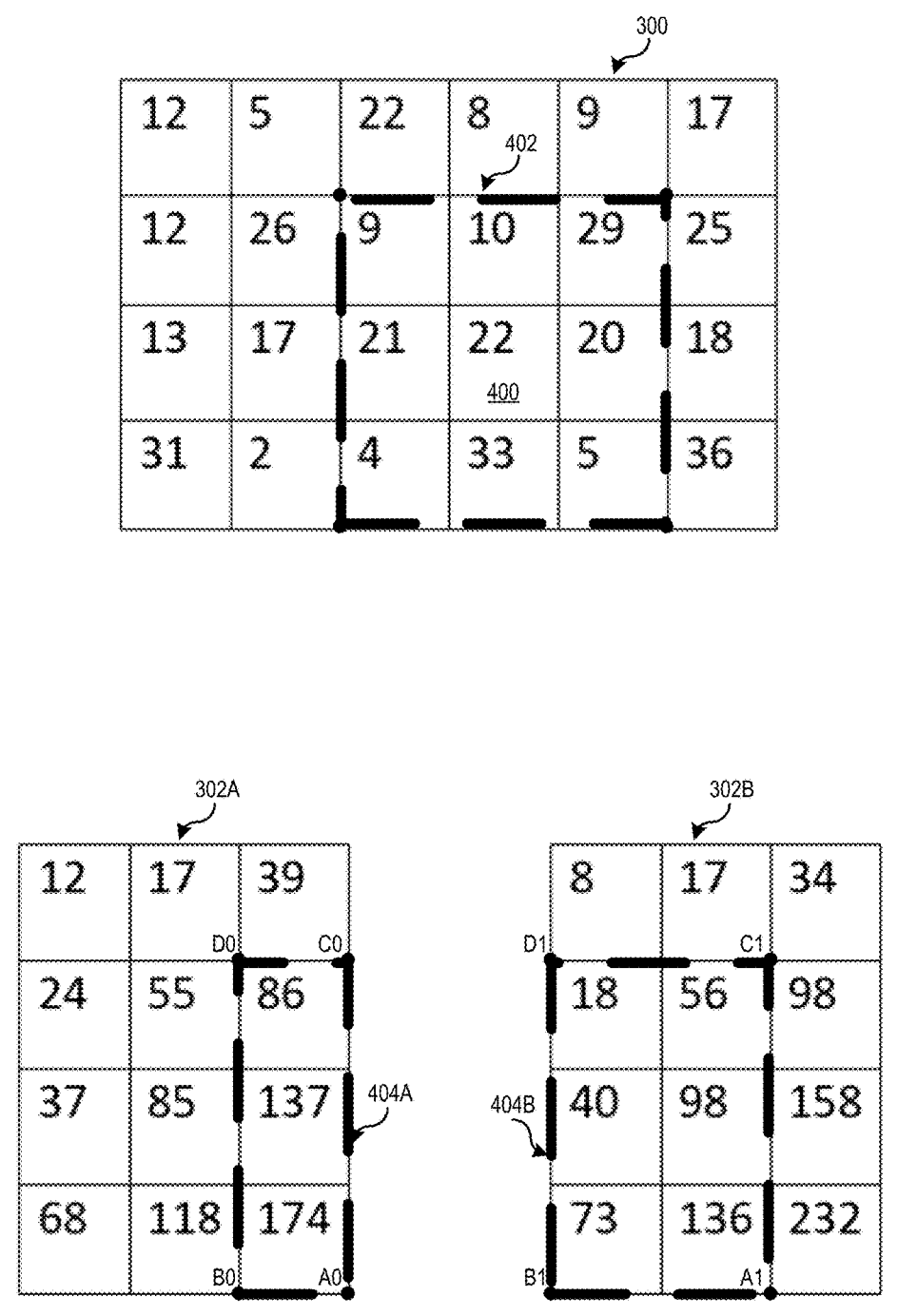

FIG. 4 illustrates an example process of determining values for performing an image processing operation on an input image in accordance with one or more embodiments. Using the table 300 from FIG. 3 that represents pixel values for an input image, the image processing module 114 can perform a blur operation for a target region 402.

In one or more embodiments, a blur operation can be performed by averaging pixel values adjacent to a pixel. The pixels values contributing to the blur operation can be either one-dimensional or two-dimensional. The example blur operation illustrated in FIG. 4 is a two-dimensional blur operation with a blur width of three pixels. To determine a blur value for pixel 400 using a two dimensional blur with a blur width of three, the target region 402 of pixels is identified. The image processing module 114 identifies the summed area sub-tables that corresponding to the target region 402. To sum the pixel values for the target region 402, the image processing module 114 uses the values from summed area sub-table 302A and summed area sub-table 302B. To calculate the sum of the pixel values for a target sub-region of the target region 402, the values of points Ax-Dx are used using the following equation:

$$\text{Pixel Sum} = Ax - Bx - Cx + Dx$$

where Ax is the sum of the pixel values from the top left of a sub-table to the bottom right corner of a target sub-region, Bx is the sum of the pixel values from the top left of the sub-table to the bottom left corner of the target sub-region, Cx is the sum of the pixel values from the top left of the sub-table to the top right corner of the target sub-region, and Dx is the sum of the pixel values from the top left of the sub-table to the top left corner of the target sub-region. Using this equation with points A0-D0 in summed area sub-table 302A, the sum of the pixel values for target sub-region 404A can be calculated as 34 (174−118−39+17). Using this equation with points A1-D1 in summed area sub-table 302B, the sum of the pixel values for target sub-region 404B can be calculated as 119 (136−0−17+0). The sum of the target region 402 using summed area sub-table 302A and summed area sub-table 302B can then be calculated as 153 (34+119). The sum calculations performed for the two target sub-regions can be further optimized as follows:

$$\text{Pixel Sum} = A0 - B0 - C0 + D0 + A1 - C1$$

as the summed pixel values at B1 and D1 will be 0. To perform a blur operation over the target region 402, the sum of the target region 402 (153) can be averaged over the number of pixels (9) in the target region 402, resulting in a pixel value of 17. To determine pixel values for additional pixels of table 300 for the pixel blur operation, similar calculations can be performed using summed area sub-table 302A and summed area sub-table 302B.

After the image processing module 114 generates the modified image 116, the modified image 116 can be sent as an output 120, as shown at numeral 7. In one or more embodiments, after the process described above in numerals 1-6, the output 120 is sent through a communications channel to the user device or computing device that provided the input requesting the image processing operation on the image 106, to another computing device associated with the user or another user, or to another system or application.

While the embodiment described with respect to FIGS. 1-4 describe an image (e.g., image 106) segmented into a plurality of vertical strips, in other embodiments, the image can be segmented into a plurality of horizontal strips, tiles, and or a combination of different segment types. In such embodiments, the summed area table generating module 110 generates a summed area table representation 112 in the manner described in the above embodiment, where the summed area sub-tables are generated based on the method of segmentation of the image, and the image processing module 114 determines the modified image 116 based on computing values from the summed area sub-tables.

In one or more embodiments, the summed area table generating module 110 can generate multiple summed area table representations of an image, where each summed area table representation can be computed in a different direction. For example, a first summed area table representation can be computed by summing values right to left and bottom to top, a second summed area table representation can be computed by summing values left to right and bottom to top, etc. Such embodiments can optimize the lookup, or summing, by the image processing module 114 by reducing the number of values to retrieve and use in calculations. For example, in FIG. 4, the values of B1 and D1 are zero because they are on the leading edge of summed area sub-table 302B, and thus they can be eliminated from the calculation of the pixel sum for target sub-region 404B, while four values (A0, B0, C0, and D0) are needed to calculate the pixel sum for target sub-region 404A. Assuming the summed area table generating module 110 generates multiple summed area table representations (not shown) using the table 300, the image processing module 114 can select the first summed area table representation (e.g., summed right to left and bottom to top) to calculate the summed values from the target sub-region 404A and select the second summed area table representation (e.g., summed left to right and bottom to top) to calculate the summed values from the target sub-region 404B. In this manner, values on the leading edge of the target sub-region 404A are zero and can be eliminated from the calculation of the pixel sum for target sub-region 404A, resulting in the pixel sum being the sum of the values at four locations (D0, B0, A1, and C1).

MIP Maps

In one or more embodiments, the summed area table generating module 110 can generate a plurality of summed area sub-tables for a single image. For example, the summed area table generating module 110 can generate MIP maps, where the plurality of summed area sub-tables can include summed area sub-tables representing an input image at different resolutions. In such embodiments, a first set of summed area sub-table represents the image at a first resolution, a second set of summed area sub-tables represent the image at a second resolution, etc.

For example, given an input image with a 1000×1 pixel resolution and a one-dimensional horizontal blur using 10-pixel wide sub-tables, MIP maps can be generated where the image at the highest resolution is level 0, with a level reduction of 10. This yields 100 level 0 sub-tables (based on 1000 pixels divided by 10-pixel wide sub-tables) and a level 1 image 100 pixels wide. For narrow queries (e.g., blurs using 10 pixels, 20 pixels, etc.), only values from a small number of sub-tables are needed for summing. However, as queries become wider (e.g., blurs across 50 pixels, etc.), the values from a greater number of sub-tables are needed for summing. The process described with respect to FIG. 1 to generate summed area sub-tables can then be performed recursively, resulting in each rightmost sub-table entry being the sum of all pixels in that sub-table. In one or more embodiments, the value of the right-most sub-table entry can be used as an entry in the next level image. With the level 1 image populated, summed area sub-tables can be calculated for the level 1 image. This process can be repeated for level 2 and so on as needed. In one or more embodiments, to generate the higher level tables, the summed area table generating module 110 can round, scale, or use a higher precision format relative to the prior level, as required. For example, in some embodiments, the summed area table generating module 110 can scale the individual sums by the scale of the texture level.

Figure 5:
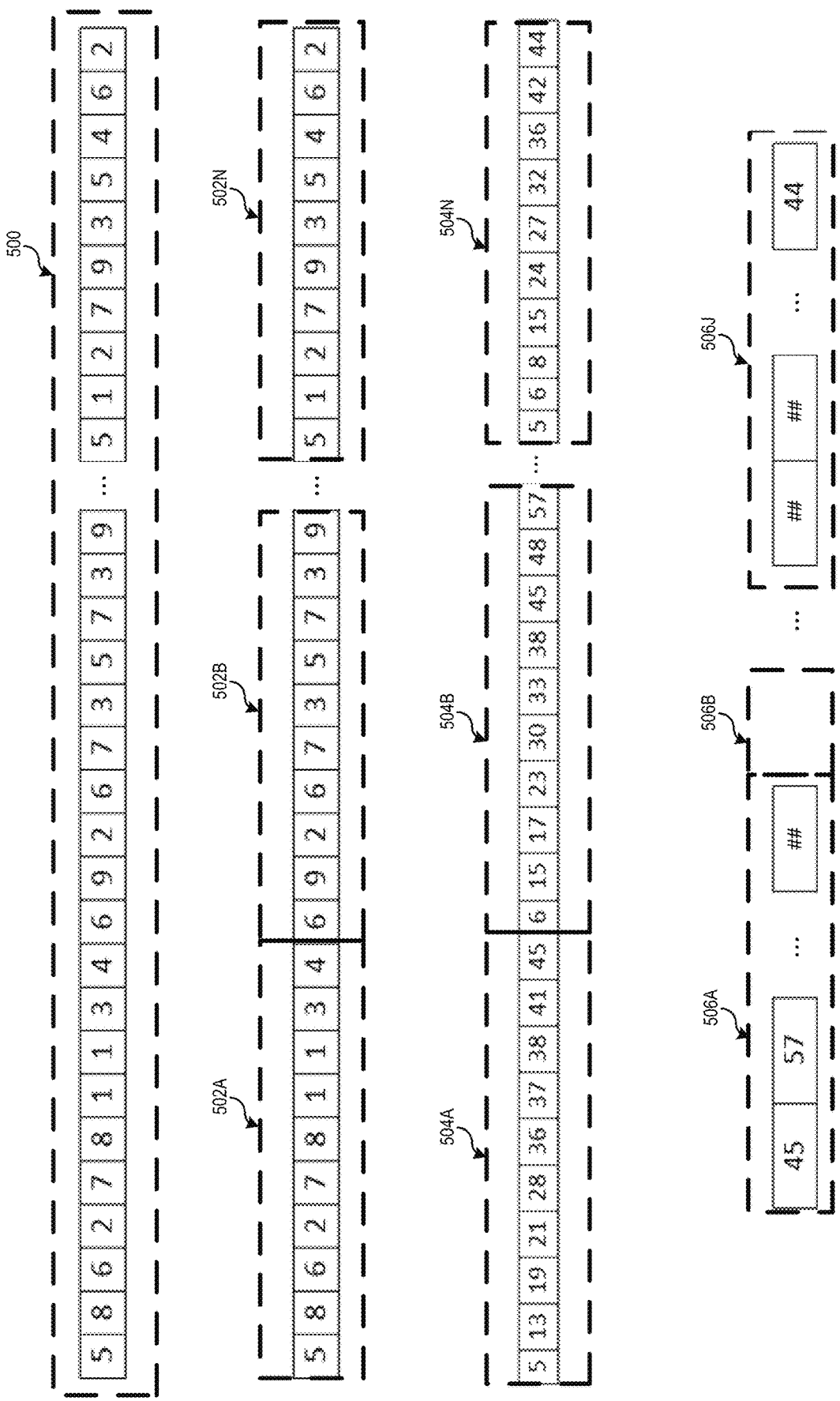
FIG. 5 illustrates an example process of generating MIP maps using summed area sub-tables in accordance with one or more embodiments.

FIG. 5 illustrates an example process of generating MIP maps using summed area sub-tables in accordance with one or more embodiments. As shown in FIG. 5, table 500 represents pixel values for an input image that is 1000×1 pixels at a highest resolutions (e.g., level 0). Table 500 depicts only a portion of all the pixel values for the input image. The summed area table generating module 110 can then divide the table 500 into smaller groupings of pixels (e.g., based on a blur size, user parameters, etc.), resulting in segments 502A-502N. In the example depicted in FIG. 5, the table is scaled by 10 at each level (e.g., 1000 summed pixel values at level 0, 100 summed pixel values at level 1, and 10 summed pixel values at level 2). In one or more embodiments, the scaling can be the same or different at different levels. Assuming that the pixels are segmented into 10 pixel segments, the input image is divided into 100 segments, where 502A includes the first ten pixel values and 502N includes the last ten pixels values of the 1000×1 pixel input image. Using the process described with respect to FIG. 1, the summed area table generating module 110 can generate summed area sub-tables 504A-504N, where each of summed area sub-tables 504A-504N represents a segment, resulting in 100 summed area sub-tables 504A-504N. The rightmost entry for each of summed area sub-tables 504A-504N is the sum of all pixels values in the corresponding segment. For example, the summed pixel value in the last entry in summed area sub-table 504A is the sum of all the pixel values in segment 502A, the summed pixel value in the last entry in summed area sub-table 504B is the sum of all the pixel values in segment 502B, etc. The summed pixel values in summed area sub-tables 504A-504N can then be used to generate summed area sub-tables 506A-504J representing pixel values for the input image at a lower resolution of 100×1 pixels (e.g., level 1). At level 1, summed area sub-tables 506A-506J store the summed pixel values (e.g., from summed area sub-tables 504A-504N) calculated from the pixel values from the segments 502A-502N at level 0, resulting in 10 summed area sub-tables 506A-506J, each with summed area values from ten summed area sub-tables of the 100 summed area sub-tables 504A-504N. For example, the first entry in summed area sub-table 506A is the sum of the pixels in segment 502A. In the example of FIG. 5, summed area sub-tables 506A-506J depict only a portion of all the summed pixel values for level 1. A similar process can be performed to generate a table of summed pixel values for level 2, where the first entry in the first level 2 summed area sub-table is the sum of pixels 0-99 from table 500, the second entry is the sum of pixels 0-199, and so on, resulting in one summed area sub-table with ten summed pixel values, where each summed pixel value is the summed area value from ten summed area sub-tables of the summed area sub-tables 504A-504N or the sum of the summed pixel values in one of summed area sub-tables 506A-506J. In one or more embodiments, as the values can be increasingly larger at each successive level, the higher levels may need scaling/rounding or extended precision to store the summed pixel values.

In one or more embodiments, when performing operations involving the pixel values of a range of pixel values, a summing process can retrieve values from the different levels of the MIP maps. In one or more embodiments, the retrieval will be performed using the highest levels when appropriate. For example, when the image processing module 114 needs to retrieve pixel values to perform a blur operations across X number of pixels, the image processing module 114 will access the summed area sub-table MIP maps. Continuing the example, for a sum of the pixel values in the range of {98, 210}, the retrieval can be simplified as:

Sum = (pixel values of {98,100}) +

(pixel values of {100, 200}) + (pixel values of {200, 210})

In one or more embodiments, the image processing module 114 determines the pixel values for the spans as follows:
triples of (scalePerLevel, level, position)→(level, sub-table, index) where scalePerLevel is the scaling (e.g., 10 in the example of FIG. 5), level indicates the level to retrieve summed pixel values from, position is the pixel for which the pixel value is desired, sub-table is the sub-table to read a summed pixel value from, and the index is the position within the sub-table to read a summed pixel value from. In this manner, the image processing module 114 can determine the level, sub-table, and index location to retrieve summed pixel values from. In one or more embodiments, the sub-table and index values can be determined using the following Python code:

Sub–Table → position // (scalePerLevel ** (level + 1))

Index → position // (scalePerLevel ** level)) % scalePerLevel)

where "**" refers to integer power, "//" refers to integer divide, and "%" is the modulus operator, with 0 based indexing.

Using the above, the pixels values of the span {98, 100} are retrieved from:
(10, 0, 98)→(0, 9, 8)
(10, 0, 100)→(0, 10, 0)
In other words, the sum of the pixels values of the span {98, 100} can be retrieved from the summed area sub-tables for level 0, specifically sub-table 9, containing pixel values for pixels 90-99, and sub-table 10, containing pixel values for pixels 100-109. The index values of "8" and "0" indicate the location within the corresponding sub-table from where to read the summed pixel value. The value retrieved for 98 can then be subtracted from the value retrieved for 100 to determine the sum of the pixel values for the span {98, 100}.

The pixels values of the span {100, 200} are retrieved from:
(10, 2, 100)→(2, 0, 1)
(10, 2, 200)→(2, 0, 2)
The sum of the pixels values of the span {100, 200} can be retrieved from the summed area sub-table for level 2, specifically sub-table 0 (e.g., the only sub-table in the example of FIG. 5), containing pixel values for pixels 100-200. The index values of "1" and "2" indicate the location within the corresponding sub-table from where to read the summed pixel value. The value retrieved for 100 can then be subtracted from the value retrieved for 200 to determine the sum of the pixel value for the span {100, 200}.

The pixels values of the span {200, 210} are retrieved from:
(10, 1, 200)→(1, 2, 0)
(10, 1, 210)→(1, 2, 1)
The sum of the pixels values of the span {200, 210} can be retrieved from the summed area sub-tables for level 1, specifically sub-table 2 containing pixel values for pixels 200-210. The index values of "0" and "1" indicate the location within the corresponding sub-table from where to read the summed pixel value. The value retrieved for 200 can then be subtracted from the value retrieved for 210 to determine the sum of the pixel values for the span {200, 210}.

In one or more embodiments, the spans can be subtractive as well as additive. For example, for a sum of the pixel values in the range of {1, 990}, the retrieval can be simplified as: Sum=(pixel values of {0, 999})−(pixel values of {0, 1})−(pixel values of {990, 999})

Figure 6:
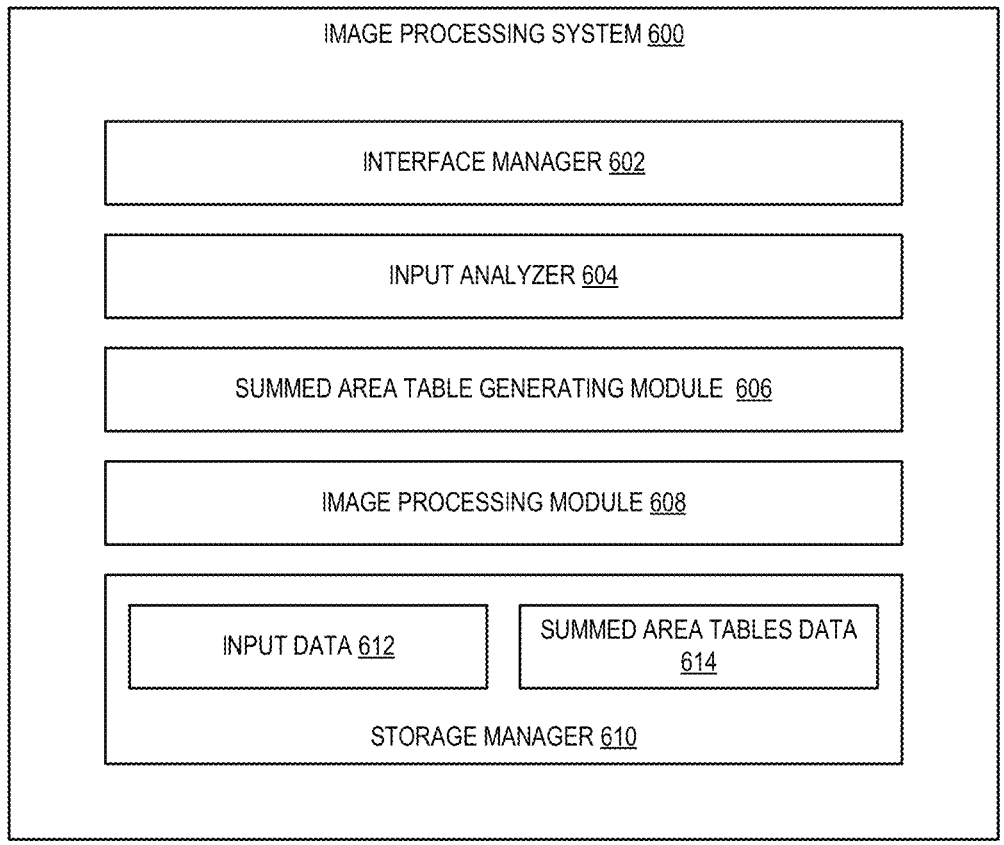
FIG. 6 illustrates a schematic diagram of an image processing system in accordance with one or more embodiments.

FIG. 6 illustrates a schematic diagram of an image processing system (e.g., "image processing system" described above) in accordance with one or more embodiments. As shown, the image processing system 600 may include, but is not limited to, an interface manager 602, an input analyzer 604, a summed area table generating module 606, an image processing module 608, and a storage manager 610. The storage manager 610 includes input data 612 and summed area tables data 614.

As illustrated in FIG. 6, the image processing system 600 includes the user interface manager 602. For example, the user interface manager 602 allows users to provide input image data to the image processing system 600. In some embodiments, the user interface manager 602 provides a user interface through which the user can upload an input image. Alternatively, or additionally, the user interface may enable the user to download the image from a local or remote storage location (e.g., by providing an address (e.g., a URL or other endpoint) associated with an image source).

Additionally, the user interface manager 602 allows users to request the image processing system 600 to perform an image processing operation (e.g., an image blur) on the input image by enabling the user to provide parameters defining the image processing operation. For example, where the image processing operation is an image blur, the user can provide parameters, including a region of the image to be blurred and a blur size (e.g., a number of pixels to blur across for each output pixel). In some embodiments, the user interface manager 602 enables the user to view the resulting output image and/or request further edits to the image.

As further illustrated in FIG. 6, the image processing system 600 also includes the input analyzer 604. The input analyzer 604 analyzes an input received by the image processing system 600 to identify input images and image processing operation parameters.

As further illustrated in FIG. 6, the image processing system 600 also includes the summed area table generating module 606. The summed area table generating module 606 is configured to generate a summed area table representation of an input. The summed area table representation of the input can be a plurality of summed area sub-tables, where each summed area sub-table covers a portion of the input. In one or more embodiments, the plurality of summed area sub-tables do not overlap. In other embodiments, the plurality of summed area sub-tables do overlap. Where the input is an image, the summed area table generating module 606 can generate summed area sub-tables storing pixel values.

As further illustrated in FIG. 6, the image processing system 600 also includes the image processing module 608. The image processing module 608 can be configured to perform image processing operations on an image, where the image processing operations is defined by user-defined parameters. For an image blur operations, the image processing module 608 receives parameters 108 including information indicating a blur region of the image and a blur size. The image processing module 608 can be configured to generate a modified image from the image using summed area sub-tables storing pixel values of the image.

As illustrated in FIG. 6, the image processing system 600 also includes the storage manager 610. The storage manager 610 maintains data for the image processing system 600. The storage manager 610 can maintain data of any type, size, or kind as necessary to perform the functions of the image processing system 600. The storage manager 610, as shown in FIG. 6, includes the input data 612. The input data 612 can include images and parameters for performing image processing operations on the images, as discussed in additional detail above. The storage manager 610, as shown in FIG. 6, also includes the summed area tables data 614. The summed area tables data 614 can include summed area sub-tables generated from the image by the summed area table generating module 606.

Each of the components 602-610 of the image processing system 600 and their corresponding elements (as shown in FIG. 6) may be in communication with one another using any suitable communication technologies. It will be recognized that although components 602-610 and their corresponding elements are shown to be separate in FIG. 6, any of components 602-610 and their corresponding elements may be combined into fewer components, such as into a single facility or module, divided into more components, or configured into different components as may serve a particular embodiment.

The components 602-610 and their corresponding elements can comprise software, hardware, or both. For example, the components 602-610 and their corresponding elements can comprise one or more instructions stored on a computer-readable storage medium and executable by processors of one or more computing devices. When executed by the one or more processors, the computer-executable instructions of the image processing system 600 can cause a client device and/or a server device to perform the methods described herein. Alternatively, the components 602-610 and their corresponding elements can comprise hardware, such as a special purpose processing device to perform a certain function or group of functions. Additionally, the components 602-610 and their corresponding elements can comprise a combination of computer-executable instructions and hardware.

Furthermore, the components 602-610 of the image processing system 600 may, for example, be implemented as one or more stand-alone applications, as one or more modules of an application, as one or more plug-ins, as one or more library functions or functions that may be called by other applications, and/or as a cloud-computing model. Thus, the components 602-610 of the image processing system 600 may be implemented as a stand-alone application, such as a desktop or mobile application. Furthermore, the components 602-610 of the image processing system 600 may be implemented as one or more web-based applications hosted on a remote server. Alternatively, or additionally, the components of the image processing system 600 may be implemented in a suite of mobile device applications or "apps."

As shown, the image processing system 600 can be implemented as a single system. In other embodiments, the image processing system 600 can be implemented in whole, or in part, across multiple systems. For example, one or more functions of the image processing system 600 can be performed by one or more servers, and one or more functions of the image processing system 600 can be performed by one or more client devices. The one or more servers and/or one or more client devices may generate, store, receive, and transmit any type of data used by the image processing system 600, as described herein.

In one implementation, the one or more client devices can include or implement at least a portion of the image processing system 600. In other implementations, the one or more servers can include or implement at least a portion of the image processing system 600. For instance, the image processing system 600 can include an application running on the one or more servers or a portion of the image processing system 600 can be downloaded from the one or more servers. Additionally, or alternatively, the image processing system 600 can include a web hosting application that allows the client device(s) to interact with content hosted at the one or more server(s).

For example, upon a client device accessing a webpage or other web application hosted at the one or more servers, in one or more embodiments, the one or more servers can provide a user of the client device with an interface to provide inputs, including input images and parameters. Upon receiving the inputs, the one or more servers can automatically perform the methods and processes described above to perform an image processing operation on the input image using generated summed area sub-tables.

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 8. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 8.

The server(s) may include one or more hardware servers (e.g., hosts), each with its own computing resources (e.g., processors, memory, disk space, networking bandwidth, etc.) which may be securely divided between multiple customers (e.g., client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 8.

Figure 7:
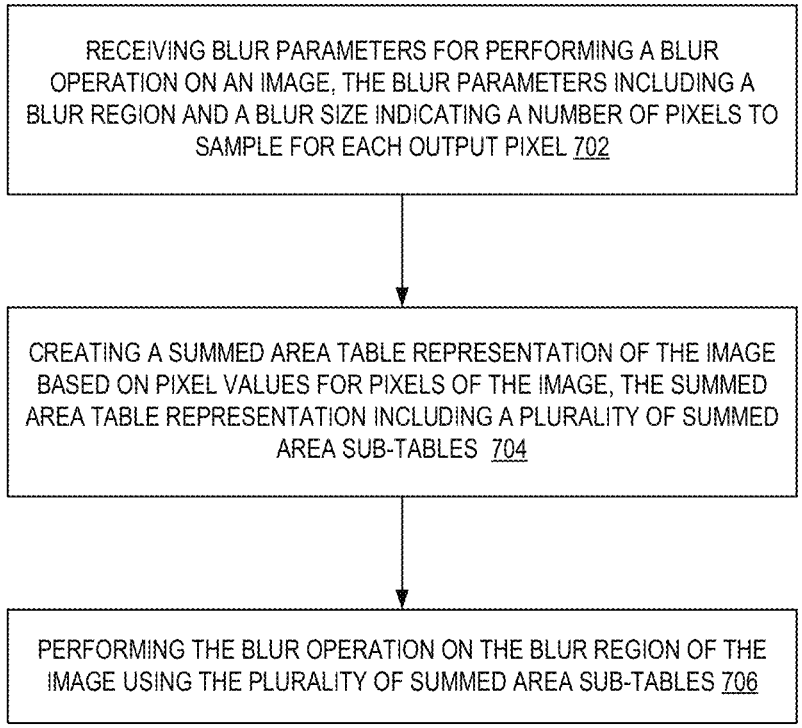
FIG. 7 illustrates a flowchart of a series of acts in a method of performing an image processing operation using summed area sub-tables in accordance with one or more embodiments.

FIGS. 1-6, the corresponding text, and the examples, provide a number of different systems and devices to allow an image processing system to perform image processing operations using summed area sub-tables. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with fewer or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart 700 of a series of acts in a method of performing an image processing operation using summed area sub-tables in accordance with one or more embodiments. In one or more embodiments, the method 700 is performed in a digital medium environment that includes the image processing system 600. The method 700 is intended to be illustrative of one or more methods in accordance with the present disclosure and is not intended to limit potential embodiments. Alternative embodiments can include additional, fewer, or different steps than those articulated in FIG. 7.

As illustrated in FIG. 7, the method 700 includes an act 702 of receiving, by an image processing system, blur parameters for performing a blur operation on an image, the blur parameters including a blur region and a blur size indicating a number of pixels to sample for each output pixel. In one or more embodiments, the image processing system receives the input from a user (e.g., via a computing device). In one or more embodiments, the user may select an input image and provide the parameters in an application, or the user may submit the input image and the parameters to a web service or an application configured to receive inputs. The input can also define a blur region of the input image. For example, after providing the input image to the application, the application can provide an interface to enable the user to select a portion of the input image. In one or more embodiments, where a blur region is not defined, the entire input image can be identified as the blur region.

As illustrated in FIG. 7, the method 700 includes an act 704 of creating a summed area table representation of the image based on pixel values for pixels of the image, the summed area table representation including a plurality of summed area sub-tables. In one or more embodiments, a summed area table generating module creates the summed area table representation of the image by determining sub-table widths for the plurality of summed area sub-tables and segments the image into a plurality of segments based on the determined sub-table widths. In some embodiments, the sub-table widths for the plurality of summed area sub-tables are determined based on one or more of the blur size received in the input, a determination that an overflow has or will occur, and a rounding error. In one or more embodiments, where the parameters indicate a variable blur size for different regions of the image, the summed area table generating module can define a first sub-table width for a first set of the plurality of segments and a second sub-table width for a second set of the plurality of segments.

In one or more embodiments, a sub-table size for the plurality summed area sub-tables can be one-dimensional or two-dimensional. In one embodiment, a one-dimensional sub-table size may be used when the input is a 1-by-x table of values, where x is greater than one. In one embodiment, a two-dimensional sub-table size may be used when the input is an x-by-y table of values, where x and y are greater than one and can be the same value.

After segmenting the image into the plurality of segments, the summed area table generating module calculates a summed area sub-table for each segment. In one or more embodiments, where the input is an image, the summed area sub-tables are generated using the pixel values of the pixels of the image.

As illustrated in FIG. 7, the method 700 includes an act 706 of performing the blur operation on the blur region of the image using the plurality of summed area sub-tables. In one or more embodiments, an image processing module or the image processing system performs the blur operation on the blur region of the image. In one embodiment, the image processing module uses the pixel values in the summed area sub-tables generated for the image to calculate a value for each output pixel in the blur region. To determine a pixel value for an output pixel, the image processing module identifies a contributing range of pixels in the image for a pixel based on the blur size. The blur size can be one-dimensional (e.g., contributing pixels are within a single horizontal row or vertical column of pixels adjacent to the pixel) or two-dimensional (e.g., contributing pixels are pixels surrounding the pixel). The image processing module determines the summed area sub-tables associated with the contributing range of pixels and calculates sub-values for each of the determined summed area sub-tables associated with the contributing range of pixels. For example, where the sub-table widths are at least the blur size, the contributing range of pixels will be located in at most two summed area sub-tables. After calculating the sub-values, the image processing module calculates the value of the output pixel by summing the calculated sub-values and dividing by the blur size. For example, if the blur size is a 3×3 pixel region around a pixel, the pixel value for the output pixel is the sum of the pixels in the 3×3 pixel region divided by nine. The image processing module repeats this process for each pixel in the blur region.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
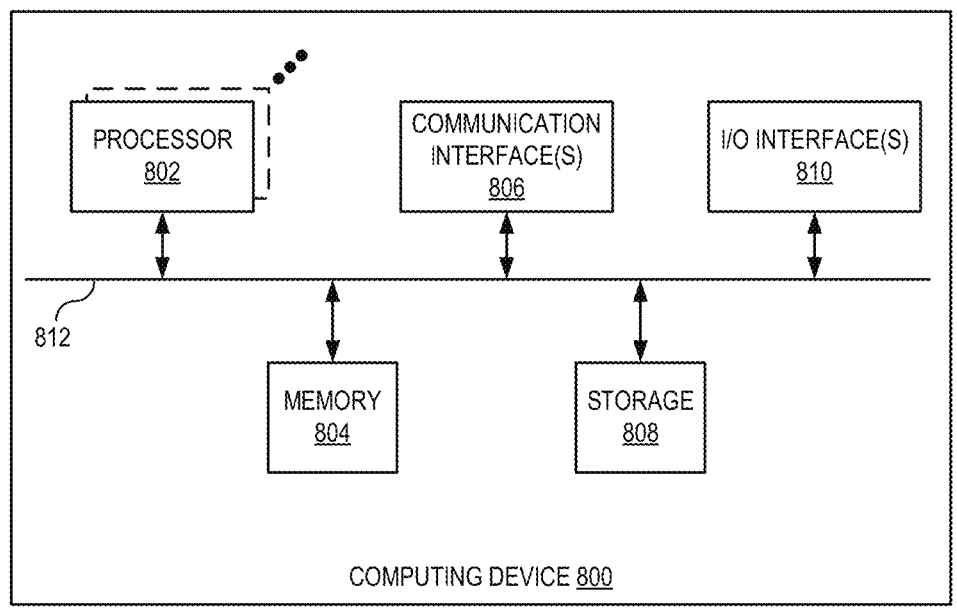
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that one or more computing devices such as the computing device 800 may implement the image processing system 600. As shown by FIG. 8, the computing device can comprise a processor 802, memory 804, one or more communication interfaces 806, a storage device 808, and one or more I/O devices/interfaces 810. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 808 and decode and execute them. In various embodiments, the processor(s) 802 may include one or more central processing units (CPUs), graphics processing units (GPUs), field programmable gate arrays (FPGAs), systems on chip (SoC), or other processor(s) or combinations of processors.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 can further include one or more communication interfaces 806. A communication interface 806 can include hardware, software, or both. The communication interface 806 can provide one or more interfaces for communication (such as, for example, packet-based communication) between the computing device and one or more other computing devices 800 or one or more networks. As an example, and not by way of limitation, communication interface 806 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

The computing device 800 includes a storage device 808 includes storage for storing data or instructions. As an example, and not by way of limitation, storage device 808 can comprise a non-transitory storage medium described above. The storage device 808 may include a hard disk drive (HDD), flash memory, a Universal Serial Bus (USB) drive or a combination these or other storage devices. The computing device 800 also includes one or more input or output ("I/O") devices/interfaces 810, which are provided to allow a user to provide input to (such as user strokes), receive output from, and otherwise transfer data to and from the computing device 800. These I/O devices/interfaces 810 may include a mouse, keypad or a keyboard, a touch screen, camera, optical scanner, network interface, modem, other known I/O devices or a combination of such I/O devices/interfaces 810. The touch screen may be activated with a stylus or a finger.

The I/O devices/interfaces 810 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 810 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving blur parameters for performing a blur operation on an image, the blur parameters including a blur region and a blur size indicating a number of pixels to sample for each output pixel;
   creating a summed area table representation of the image based on pixel values for pixels of the image, the summed area table representation including a plurality of summed area sub-tables, wherein the plurality of summed area sub-tables includes a first set of summed area sub-tables representing the image at a first resolution and a second set of summed area sub-tables representing the image at a second resolution; and
   performing the blur operation on the blur region of the image using the plurality of summed area sub-tables.

2. The computer-implemented method of claim 1, wherein creating the summed area table representation of the image further comprises:
   determining sub-table widths for the plurality of summed area sub-tables;
   segmenting the image into a plurality of segments based on the determined sub-table widths; and
   for each segment of the plurality of segments, calculating a summed area sub-table.

3. The computer-implemented method of claim 2, wherein the calculated summed area sub-table for each segment is based only on the pixel values of pixels in the segment.

4. The computer-implemented method of claim 2, wherein determining the sub-table widths for the plurality of summed area sub-tables further comprises:
   defining a first sub-table width for a first set of the plurality of segments and a second sub-table width for a second set of the plurality of segments.

5. The computer-implemented method of claim 2, wherein the sub-table widths for the plurality of summed area sub-tables are determined based on one or more of the blur size and a determination of an overflow.

6. The computer-implemented method of claim 1, wherein creating the summed area table representation of the image further comprises:
   determining a sub-table size for the plurality of summed area sub-tables, wherein the sub-table size is two dimensional;
   segmenting the image into a plurality of segments based on the determined sub-table size; and
   for each segment of the plurality of segments, calculating a summed area sub-table.

7. The computer-implemented method of claim 1, wherein performing the blur operation on the blur region of the image using the plurality of summed area sub-tables further comprises:
calculating a value of each output pixel in the blur region by:
identifying a contributing range of pixels in the image for an output pixel based on the blur size,
determining the summed area sub-tables associated with the contributing range of pixels,
calculating sub-values for each of the determined summed area sub-tables associated with the contributing range of pixels, and
calculating the value of the output pixel by summing the calculated sub-values and dividing by the blur size.

8. A non-transitory computer-readable medium storing executable instructions, which when executed by a processing device, cause the processing device to perform operations comprising:
receiving blur parameters for performing a blur operation on an image, the blur parameters including a blur region and a blur size indicating a number of pixels to sample for each output pixel;
creating a summed area table representation of the image based on pixel values for pixels of the image, the summed area table representation including a plurality of summed area sub-tables, wherein the plurality of summed area sub-tables includes a first set of summed area sub-tables representing the image at a first resolution and a second set of summed area sub-tables representing the image at a second resolution; and
performing the blur operation on the blur region of the image using the plurality of summed area sub-tables.

9. The non-transitory computer-readable medium of claim 8, wherein the instructions to create the summed area table representation of the image further cause the processing device to perform operations comprising:
determining sub-table widths for the plurality of summed area sub-tables;
segmenting the image into a plurality of segments based on the determined sub-table widths; and
for each segment of the plurality of segments, calculating a summed area sub-table.

10. The non-transitory computer-readable medium of claim 9, wherein the calculated summed area sub-table for each segment is based only on the pixel values of pixels in the segment.

11. The non-transitory computer-readable medium of claim 9, wherein the instructions to determine the sub-table widths for the plurality of summed area sub-tables further cause the processing device to perform operations comprising:
defining a first sub-table width for a first set of the plurality of segments and a second sub-table width for a second set of the plurality of segments.

12. The non-transitory computer-readable medium of claim 8, wherein the instructions to create the summed area table representation of the image further cause the processing device to perform operations comprising:
determining a sub-table size for the plurality of summed area sub-tables, wherein the sub-table size is two dimensional;
segmenting the image into a plurality of segments based on the determined sub-table size; and
for each segment of the plurality of segments, calculating a summed area sub-table.

13. The non-transitory computer-readable medium of claim 8, wherein the instructions to perform the blur operation on the blur region of the image using the plurality of summed area sub-tables further cause the processing device to perform operations comprising:
calculating a value of each output pixel in the blur region by:
identifying a contributing range of pixels in the image for an output pixel based on the blur size,
determining the summed area sub-tables associated with the contributing range of pixels,
calculating sub-values for each of the determined summed area sub-tables associated with the contributing range of pixels, and
calculating the value of the output pixel by summing the calculated sub-values and dividing by the blur size.

14. A system comprising:
a memory component; and
a processing device coupled to the memory component, the processing device to perform operations comprising:
receiving blur parameters for performing a blur operation on an image, the blur parameters including a blur region and a blur size indicating a number of pixels to sample for each output pixel;
creating a summed area table representation of the image based on pixel values for pixels of the image, the summed area table representation including a plurality of summed area sub-tables, wherein the plurality of summed area sub-tables includes a first set of summed area sub-tables representing the image at a first resolution and a second set of summed area sub-tables representing the image at a second resolution; and
performing the blur operation on the blur region of the image using the plurality of summed area sub-tables.

15. The system of claim 14, wherein the operations of creating the summed area table representation of the image further comprises:
determining sub-table widths for the plurality of summed area sub-tables;
segmenting the image into a plurality of segments based on the determined sub-table widths; and
for each segment of the plurality of segments, calculating a summed area sub-table.

16. The system of claim 15, wherein the calculated summed area sub-table for each segment is based only on the pixel values of pixels in the segment.

17. The system of claim 15, wherein the operations of determining the sub-table widths for the plurality of summed area sub-tables further comprises:
defining a first sub-table width for a first set of the plurality of segments and a second sub-table width for a second set of the plurality of segments.

18. The system of claim 14, wherein the operations of creating the summed area table representation of the image further comprises:
determining a sub-table size for the plurality of summed area sub-tables, wherein the sub-table size is two dimensional;
segmenting the image into a plurality of segments based on the determined sub-table size; and
for each segment of the plurality of segments, calculating a summed area sub-table.

19. The system of claim 14, wherein the operations of performing the blur operation on the blur region of the image using the plurality of summed area sub-tables further comprises:
- calculating a value of each output pixel in the blur region by:
  - identifying a contributing range of pixels in the image for an output pixel based on the blur size,
  - determining the summed area sub-tables associated with the contributing range of pixels,
  - calculating sub-values for each of the determined summed area sub-tables associated with the contributing range of pixels, and
  - calculating the value of the output pixel by summing the calculated sub-values and dividing by the blur size.

* * * * *